(12) United States Patent
Kinsey, III et al.

(10) Patent No.: US 7,671,753 B2
(45) Date of Patent: Mar. 2, 2010

(54) SLURRY MONITORING SYSTEM AND METHOD

(75) Inventors: E. Wayne Kinsey, III, Houston, TX (US); Michael Miller, Houston, TX (US); Howard Lee Harry, Houston, TX (US); Gordon Randall Dixon, Houston, TX (US)

(73) Assignee: Benchmark Research & Technology, LLC, Houston, TX (US)

( * ) Notice: Subject to any disclaimer, the term of this patent is extended or adjusted under 35 U.S.C. 154(b) by 691 days.

(21) Appl. No.: 11/506,240

(22) Filed: Aug. 17, 2006

(65) Prior Publication Data

US 2008/0046119 A1 Feb. 21, 2008

(51) Int. Cl.
*G08B 21/00* (2006.01)
*G08B 19/02* (2006.01)
*G08B 17/00* (2006.01)

(52) U.S. Cl. ............... 340/618; 340/612; 340/616; 340/617; 340/580; 340/581; 340/584

(58) Field of Classification Search ............... None
See application file for complete search history.

(56) References Cited

U.S. PATENT DOCUMENTS

| 5,519,638 | A * | 5/1996 | Tiao | ............... 700/281 |
| 2002/0154017 | A1 * | 10/2002 | Farner | ............... 340/612 |
| 2006/0033631 | A1 * | 2/2006 | Cupples et al. | ............... 340/612 |
| 2006/0170543 | A1 * | 8/2006 | Schaffer et al. | ............... 340/521 |

OTHER PUBLICATIONS

Spider MT-G, Enfora, [online], [retrieved from the internet on Jul. 25, 2006 using <URL: http://www.enfora.com/downloads/specsheets/GSM2200HR.pdf>.
Non-contact level measurement in liquids even for extreme process conditions, Micropilot M/S, [online], [retrieved from the internet on Jul. 25, 2006 using <URL: http://www.us.endress.com/eh/sc/america/us/en/products/home.nsf/contentview/F84D2B7F41EC5E65C125689C00459A77>.

* cited by examiner

*Primary Examiner*—Julie Lieu
(74) *Attorney, Agent, or Firm*—Christopher L. Makay (57) ABSTRACT

System and method are disclosed for monitoring slurry from a central location and replenishing the slurry as needed. The method/system allows a slurry supplier to track various properties of the slurry, as well as monitor various aspects of the slurry storage and delivery system. When the volume of slurry at the remote location falls below a predetermined point, the slurry supplier can schedule both the production of the appropriate slurry and its timely delivery to the customer. Changes in the condition of existing slurry, as well as leaks and other malfunctions in the slurry storage system, may be promptly detected and the slurry supplier immediately notified so that corrective actions may be taken. Multiple slurry storage systems at several remote locations may be monitored simultaneously from the central location. Such an arrangement offers a complete, one-stop solution to customers whose businesses depend on a reliable supply of "field ready" slurry.

32 Claims, 5 Drawing Sheets

SLURRY MONITORING SYSTEM AND METHOD

FIELD OF THE INVENTION

The present invention relates to the use of viscous fluids in industrial processes and, in particular, to a system and method of supplying and monitoring the condition of such viscous fluids.

BACKGROUND OF THE INVENTION

Various types of viscous fluids are used in industrial processes. For example, viscous fracturing fluids are used to enhance production of oil and gas (hydrocarbons) from wells in which the subterranean pressure has declined.

When oil and/or gas are removed from a subterranean formation through drilling, the pressure in the formation declines. As a result of the pressure decline, the production of oil and/or gas from the well also declines. Although oil and/or gas may still be present in the formation, production may decrease to such an extent that further removal of oil and/or gas becomes uneconomical. In such cases, it is crucial to extract as much oil and/or gas from the formation as possible. Production from formations in which the pressure has declined may be raised by techniques generally known as well stimulation. To stimulate an oil and/or gas well, a fracturing fluid, consisting of a viscous slurry—typically incorporating a suspended guar polymer (and other additives) in a carrier fluid—along with other chemical additives—is injected into the formation, under high pressure, via the well's bore hole. By applying hydraulic pressure within the formation, the fracturing fluid fractures the subterranean strata surrounding the bore hole, thereby increasing and extending the area from which oil and/or gas may be drained. Once a fracture is induced, a propping agent, such as sand, is added to the slurry, causing the fracture to remain open after the slurry is removed. After the desired amount of proppant has been placed in the fractured formation, pumping is terminated, the slurry is chemically "broken" and removed, and the well is shut-in for a time. Later, the well is reopened in order to recover the oil and/or gas through the fractures thus created.

To be effective in the fracturing process, the slurry used in the fracturing fluid must have certain chemical properties and must be maintained under certain conditions. For example, depending upon the nature of the subterranean formation to be fractured and other down-hole characteristics of the well (such as temperature), the slurry must have a certain viscosity and pH before it can be used, the specific viscosities, pH and other properties of the slurry being unique—and often proprietary—to the fracturing fluids employed by each pumping service company. Otherwise, the slurry may be ineffective for its intended purpose. It may also cause equipment malfunctions, such as the clogging of pumps and hoses. Moreover, there has to be enough field-ready slurry on-hand for the intended fracturing application, else lengthy delays and costly downtime may result. Mixing adequate quantities of consistently high quality slurry in the field has always been difficult and time-consuming. It is therefor important to the oil and gas well pressure pumping services industry that appropriate slurries be delivered and maintained in "field ready" condition, improving not only product performance, but also field efficiencies.

One way to ensure that a sufficient quantity of field-ready slurry is always available is to store pre-mixed, field-ready slurries in one or more tanks, either on the drilling site or close thereto. The slurry may then be pumped from the tanks (or transported a short distance and pumped from the transport) to the well bores as needed. When the slurry supply becomes low, a slurry manufacturing and supply company, such as Benchmark Energy Products, L.P., of Houston, Tex., may be called upon to replenish the slurry. The slurry supply company delivers the new slurry in a "field ready" condition to the tank site, typically using one or more tanker trucks. The frequency with which the slurry supply company delivers the new slurry depends on several factors, including the size of the local tanks, the rate of usage, and other similar factors.

A drawback of the above arrangement is that it is an entirely manual process. Usually, one or more persons have to physically gauge and monitor the level of the slurry in the tanks and alert the slurry manufacturing and supply company when the level becomes low. In addition, the condition of the slurry in the tank(s) also has to be monitored to ensure the slurry remains "field ready." Over time, the slurries are susceptible to degradation—particularly settlement of the suspended polymer, especially at extreme temperatures—if not periodically (re)mixed. Depending on the number of slurry storage tanks in use, these constant monitoring and mixing tasks may significantly strain the available technical and personnel resources, and, if not properly attended to, lead to product waste, or worse, to job failures. The mechanical components of the slurry storage system (such as the tanks, pumps, compressors, mixers, and valves) must also be constantly monitored and maintained to ensure operational integrity and prevent spills and leaks that could lead to environmental contamination.

Accordingly, what is needed is way automate the above process. In particular, what is needed is a way to continuously monitor both the quantities and the condition of the slurry in multiple tanks, at local as well as remote storage sites, from a single centralized location, to remotely direct the re-mixing of the slurry, if and when necessary, and to automatically re-supply the customer on as "as need" basis, thereby ensuring that an adequate supply of high quality, "field ready" slurry is available at all times.

SUMMARY OF THE INVENTION

The present invention is directed to a system and method for monitoring a slurry stored at a remote location. The method/system of the invention allows a slurry supplier to monitor the slurry from a central location and replenish the slurry as needed. The slurry supplier may track various aspects and properties of the slurry, as well as monitor various aspects of the slurry storage and delivery system, including the pumps, compressors, mixers, valves, tanks, and other elements of the on-site storage system used to store the slurry. When the volume of slurry at the remote location falls below a certain, predetermined point, the slurry supplier can schedule both the production of the appropriate slurry and its timely delivery to the customer. Changes in the condition of existing slurry, as well as leaks and other malfunctions in the slurry storage system, may be promptly detected and the slurry supplier immediately notified so that corrective actions may be taken. Multiple slurry storage systems at several remote locations may be monitored simultaneously from the central location. Such an arrangement offers a complete, one-stop solution to customers whose businesses depend on a reliable supply of "field ready" slurry.

In general, in one aspect, the invention is directed to method of satisfying a customer's slurry needs from a single source. The method comprises providing a customer with a supply of slurry, the slurry being stored in a remotely located slurry storage system. The method further comprises monitoring at least one condition of the slurry stored in the slurry storage system for compliance with one or more predefined criteria and activating an alarm if a level of the slurry stored in the slurry storage system falls below a predefined threshold. New slurry is delivered to the customer based upon activation of the alarm.

In general, in another aspect, the invention is directed to a system for monitoring slurry from a central location, the slurry stored in a slurry storage system. The system comprises one or more sensors installed in the storage tank assembly, the sensors configured to acquire data regarding a level and condition of the slurry. The system further comprises a central control unit configured to receive the data regarding the level and condition of the slurry acquired by the sensors, and to activate an alarm if the data indicates the level of the slurry falls below a predefined threshold. Means are provided for delivering new slurry to the customer based upon activation of the alarm by the central control unit.

In general, in yet another aspect, the invention is directed to a system for monitoring multiple slurry storage systems from a central location. The system comprises one or more sensors, at least one sensor installed on each slurry storage system and configured to acquire data regarding a level and condition of slurry in each slurry storage system. The system further comprises one or more tracking units, each tracking unit mounted at one of the slurry storage systems and interfaced with the at least one sensor installed on each slurry storage system, the tracking unit configured to receive the data regarding the level and condition of the slurry from the at least one sensor. A backend server in communication with the one or more tracking units is configured to store and process the data regarding the level and condition of the slurry from each tracking unit. A central control unit is configured to access the data regarding the level and condition of the slurry from each tracking unit, the central control unit further configured to activate an alarm if the data indicates the level of the slurry at any one of the slurry storage systems is below a predefined threshold.

BRIEF DESCRIPTION OF THE DRAWINGS

The foregoing and other advantages of the invention will become apparent from the following detailed description and upon reference to the drawings, wherein.

DESCRIPTION OF ILLUSTRATIVE EMBODIMENTS

Following is a detailed description of illustrative embodiments of the invention with reference to the drawings wherein the same reference labels are used for the same or similar elements. It should be emphasized that, although the invention is described primarily with respect to the oil and gas production industry, it is not to be limited thereto, but is equally applicable to any industry where viscous fluids are used.

Figure 1:
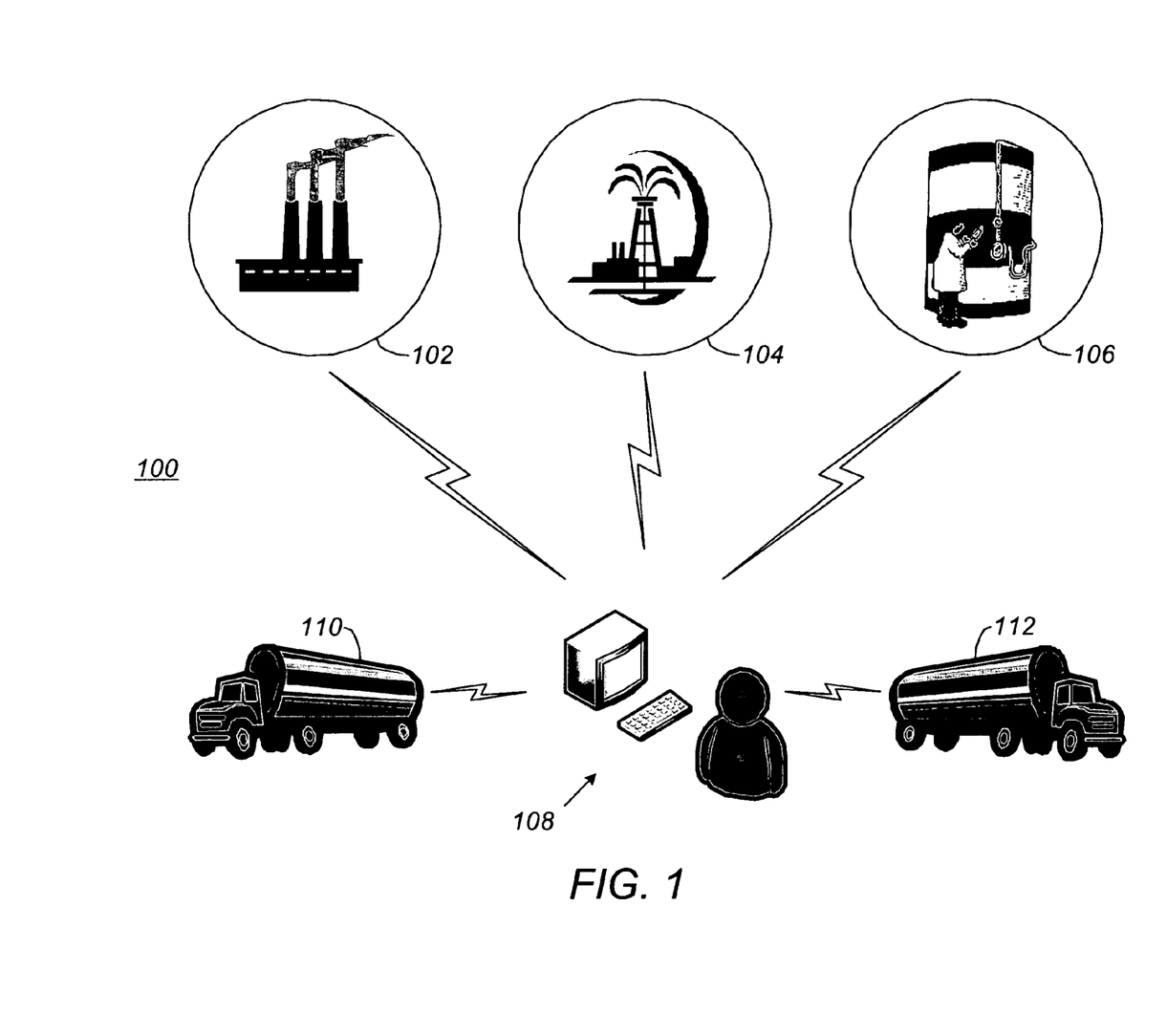
FIG. 1 illustrates an overview of an exemplary method and system according to embodiments of the invention.

As mentioned above, embodiments of the invention provide a method and system for monitoring slurry from a remote location and delivering additional slurry as needed. Referring now to FIG. 1, an overview 100 of an exemplary method and system for monitoring and delivering slurry according to embodiments of the invention is shown. The slurry may be stored at a single location, or it may be stored at multiple locations (indicated generally at 102, 104, and 106). One or more sensors and/or meters (not visible here) installed at each location 102-106 reads and/or measures various aspects of the slurry being stored, including the pumps, compressors, mixers, valves, tanks, and other elements of the storage system used to store the slurry. Such sensors may include any sensors known to those having ordinary skill in the art, for example, pH meters, temperature sensors, flow rate sensors, level sensors, viscosity sensors, and the like.

The sensors and/or meters are connected to a remotely located central control unit 108 that monitors the readings and measurements from the sensors. Preferably the remotely located control unit 108 resides at the slurry supplier, but other locations may certainly be used for the monitoring. Connection to the remotely located control unit 108 may be any suitable wired and/or wireless network known to those having ordinary skill in the art, including a LAN (local area network), WAN (wide area network), VPN (virtual private network), the Internet, cellular network, and/or satellite network.

Upon receiving the readings and measurements from the sensors, the central control unit 108 may prompt or cause certain actions to be taken based on the data provided by the sensors. For example, the central control unit 108 may prompt the slurry supplier to schedule a delivery of new slurry to the one or more locations 102-108 if the sensor data indicates that the slurry supply level is low. The slurry may be delivered, for example, using one or more tanker trucks 110 and 112 or other delivery means known to those having ordinary skill in the art. In addition, the central control unit 108 may cause one or more of the pumps, compressors, mixers, valves, tanks, and other elements of the slurry storage system to be activated and/or adjusted if the sensors indicate, for example, that the temperature, flow rate, or pH is outside a predetermined range.

In some embodiments, the method and system of the invention may be implemented using a supervisory control and data acquisition (SCADA) architecture. SCADA systems are well-known to those having ordinary skill in the art and will not be described in detail here. It is sufficient to say that, in general, a SCADA system involves the use of sensors and/or meters to monitor various aspects of a system and report data regarding those aspects to a central control unit. In some implementations, the sensors and/or meters may use programmable logic controllers (PLC). The PLCs are capable of gathering data from various system elements as well as carrying out certain operations or functions on those system elements, as instructed by the central control unit 108. Thus, for example, one or more PLCs (not visible here) may be set up at each location 102-106 to monitor various aspects of the slurry storage system there and report back to the central control unit 108. The central control unit 108 may then be used to issue appropriate instructions to the PLCs to perform certain operations known to those having ordinary skill in the art based on the data reported by the PLCs. The instructions may be automatically issued by the central control unit 108 (i.e., no user intervention is necessary), and/or there may be a manual component to the instructions (i.e., a user uses the central control unit 108 to issue the instructions).

Figure 2:
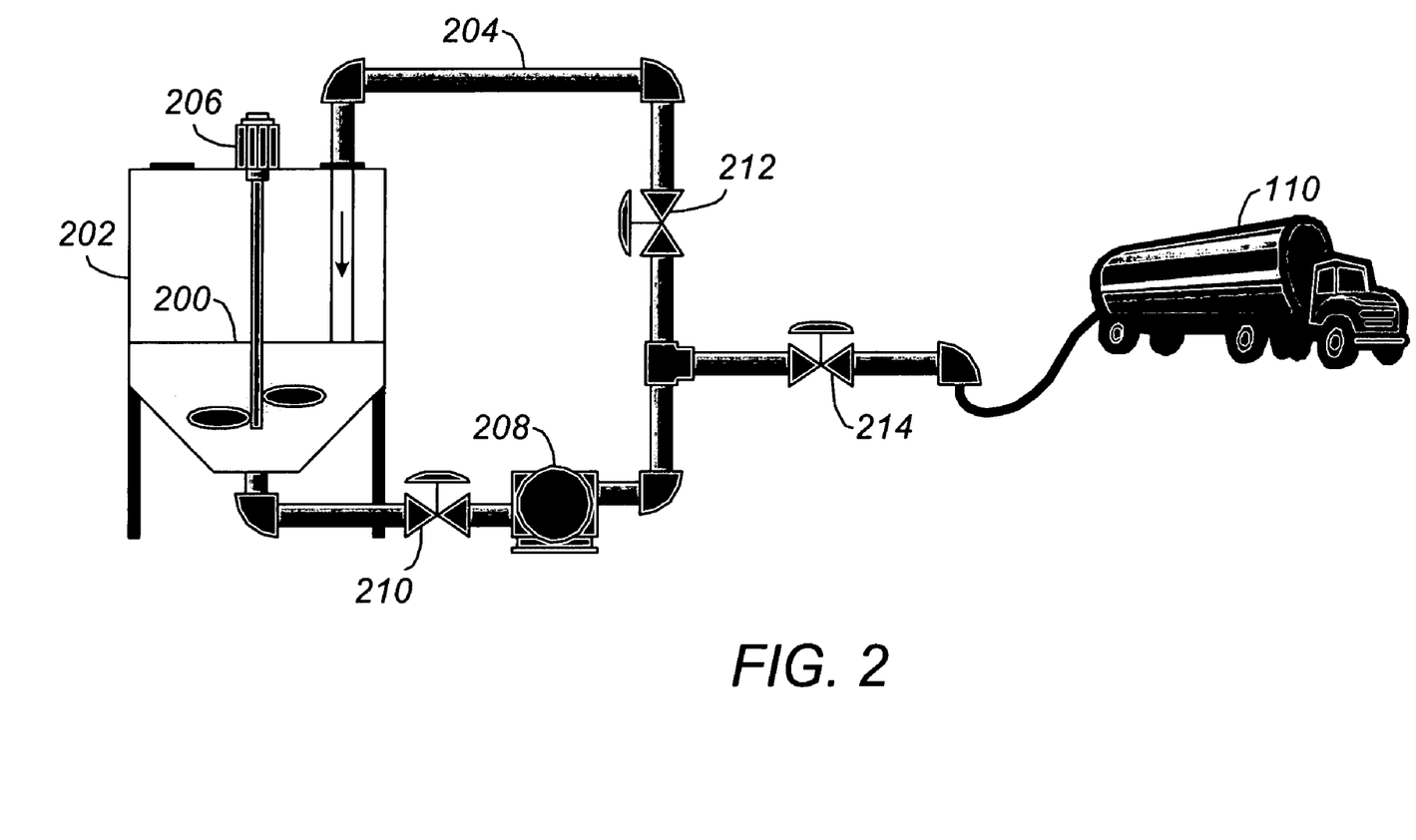
FIG. 2 illustrates an exemplary implementation of a slurry storage system according to embodiments of the invention.

FIG. 2 illustrates an exemplary implementation of the present invention at one of the locations 102-108. As can be seen, slurry 200 is typically stored in a slurry tank 202, which may be a conventional slurry storage tank having a standard size, shape, and storage capacity typically used in the oil and gas production industry. A mixer 206 agitates the slurry and helps maintain it in a consistent and homogeneous state. Similarly, a pump 208 circulates the slurry 200 in the tank 202 through a plurality of interconnected pipes sections 204 in order to facilitate the mixing process. Valves 210, 212, and 214 open and close the pipes sections 204 to control the flow of the slurry 200 therethrough. A tanker truck 110 delivers new slurry to the locations 102-108 when the level of slurry 200 in the slurry storage tank 202 falls below a certain point. The deliveries may be scheduled based on an alarm or other notification from the central control unit 108 when the central control unit 108 detects that the level of the slurry 200 has fallen below a predefined point. In some embodiments, the slurry is delivered within a certain amount of time after the alarm or other notification has been raised, based on a prearranged level-of-service agreement between the slurry supplier and the customer.

Although not expressly shown, in some embodiments, the tank 202, pipe sections 204, mixer 206, pump 208, and valves 210-214 may have one or more sensors and/or meters connected thereto. The sensors and/or meters may be any suitable, commercially available PLC that are configurable to obtain data pertaining to the operation of these components and report the data to the central control unit 108. Such data may include, for example, the condition (e.g., level, temperature, viscosity, pH, etc.) of the slurry 200 in the tank 202, the status of the valves 210-214, the flow rate through the pipe sections 204, whether the mixer 206 is on or off, the output of the pump 208, and the like. Other sensors/PLCs may also be used to monitor other aspects of the slurry 200 stored in the slurry storage tank 202. Such an arrangement allows changes in the condition of existing slurry, as well as leaks and other contingencies in the slurry storage system, to be promptly detected, the slurry supplier quickly notified, and corrective actions immediately taken, as needed.

Figure 3:
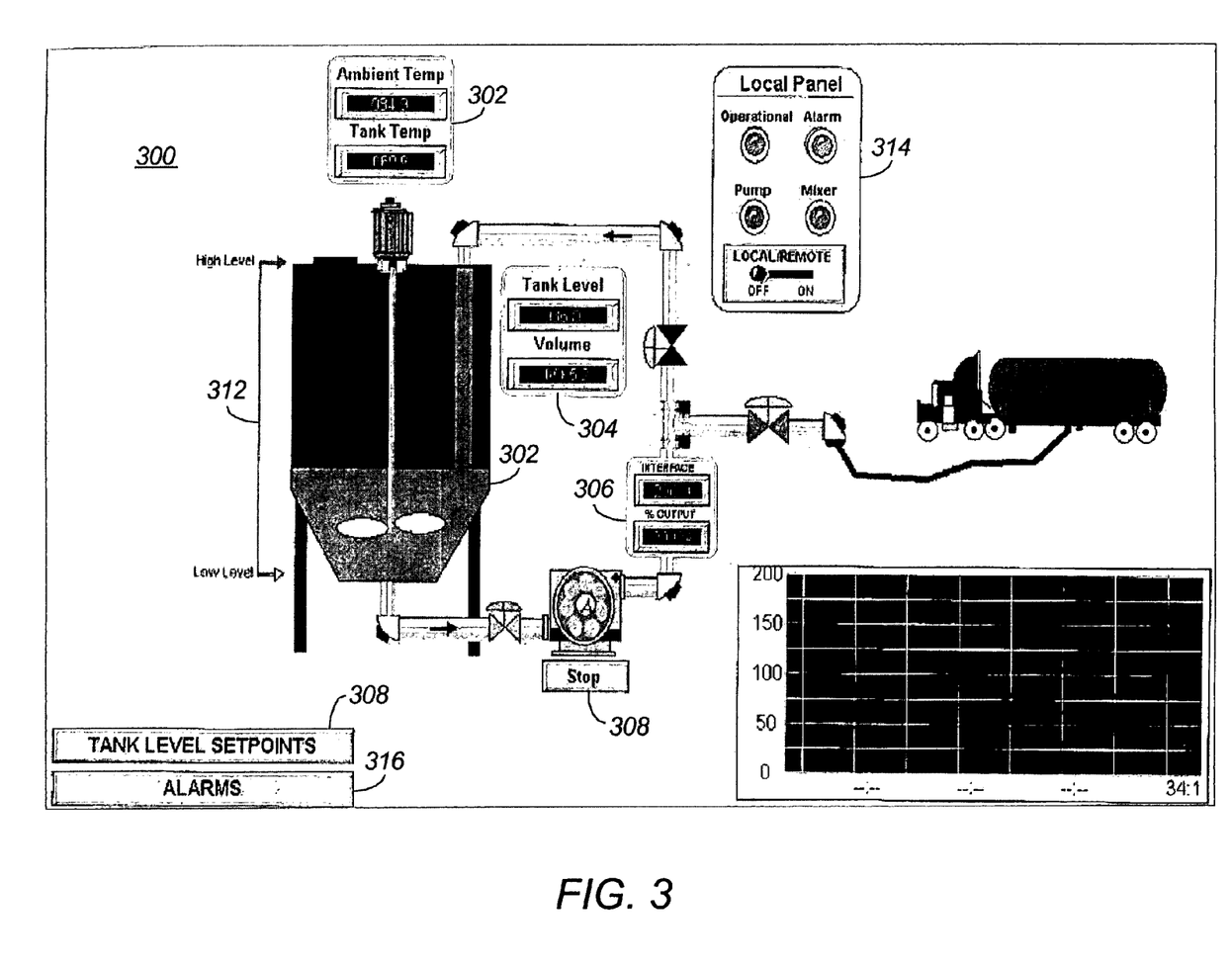
FIG. 3 illustrates an exemplary user interface for a control system according to embodiments of invention.

In some embodiments, control and monitoring of the various sensors and/or meters may be accessed via a user interface of the central control unit 108. FIG. 3 illustrates an exemplary user interface 300 that may be used to control and monitor the sensors and/or meters. The user interface 300 may reside on the central control unit 108 in the form of computer-readable instructions, for example, on a computer-readable medium connected to the central control unit 108. Preferably the central control unit 108 is accessible only by authorized personnel, for example, at the slurry supplier and/or at the customer. As can be seen in this example, the user interface 300 is a graphical interface that visually depicts the slurry storage system being monitored. Such a graphical user interface 300 may be a touchscreen-operated user interface, a mouse-operated user interface, or it may be operated using some other pointing device. Alternatively, instead of a graphical interface, in some embodiments, the user interface 300 may be in the form of a spreadsheet where the sensors and/or meters are listed in the rows and columns of the spreadsheet. And although the user interface 300 shows only one slurry storage system being monitored here, those having ordinary skill in the art will understand that multiple slurry storage systems may be monitored simultaneously using the user interface 300, each storage system being selectable via the touchscreen, mouse, or other pointing device (not expressly shown).

In the graphical embodiment of FIG. 3, the user interface 300 contains a plurality of modules that display various information about slurry storage system. For example, the user interface 300 may include a temperature module 302 that displays the ambient temperature as well as a temperature inside the slurry storage tank 202. In addition, the user interface 300 may include a slurry level module 304 that displays the level of the slurry 200 in the tank 202, and a flow module 306 that displays the flow rate through the pipe sections 204. A toggle button 308 allows the pump 208 to be toggled between an On and Off state, which causes one or more sensors/PLCs mounted on the pump to 208 start and stop the pump 208 accordingly.

A tank level setpoint button 310 allows the high and low levels of the slurry storage tank to be defined, as indicated by a slurry level indicator 312. Thus, for example, if the level of the slurry in the storage tank falls below the low level set point indicated by the slurry level indicator 312, the user interface 300 prompts or otherwise notifies personnel at the slurry supplier of this condition by activating an alarm. The personnel at the slurry supplier may then schedule delivery of new slurry to the one or more locations 102-106.

In some embodiments, a local panel module 314 allows the user to switch between local and remote control of the pumps 208 and mixers 206. The local panel module 314 allows personnel at the slurry supplier to activate one or more components of the slurry storage system (e.g., the mixers, pumps, etc.), as needed, and also gives the status of the slurry storage system (e.g., operational, alarm, etc.). This eliminates the need to have someone locally at the one or more locations 102-106 manually monitor the slurry level and alert the slurry supplier. When toggled On, the local panel module 314 cedes control of the one or more components of the slurry storage system (e.g., the mixers, pumps, etc.) to local personnel. In some embodiments, an alarms button 316 resets any alarms that may have been activated. Such an arrangement allows all the needs of the customer, including replenishing of the slurry, to be satisfied from a single source.

Figure 4:
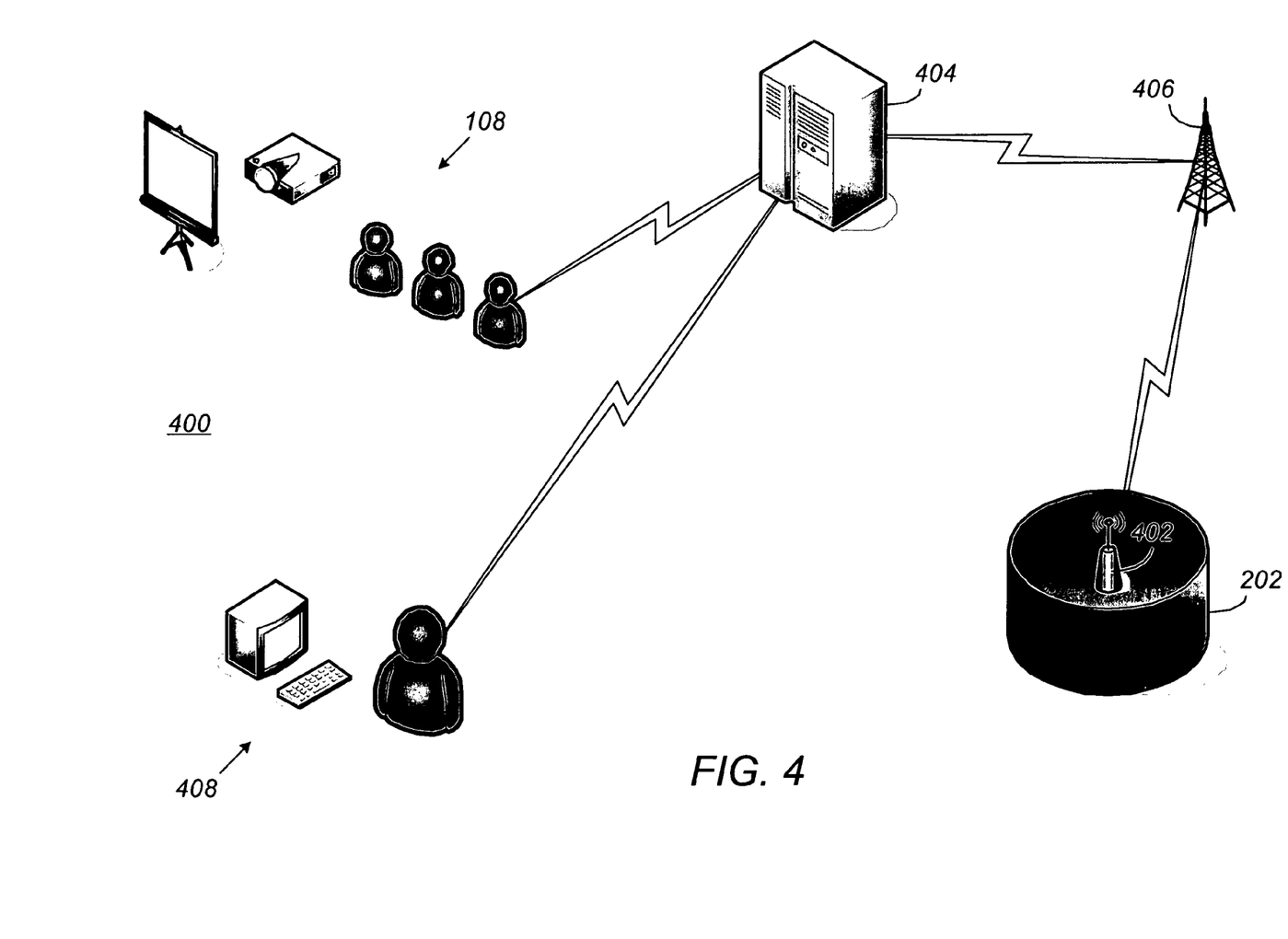
FIG. 4 illustrates an exemplary communication system for a control system according to embodiments of invention.

FIG. 4 illustrates an exemplary implementation of the slurry monitoring method and system of the present invention for one slurry storage system, according to some embodiments. Those having ordinary skill in the art will understand that the method and system may be applied to any number of slurry storage systems without departing from the scope of the invention. As can be seen, a tracking unit 402 is mounted to the slurry storage system, for example, on the slurry tank 202, for transmitting data regarding various aspects of the slurry 200 and the slurry storage system to the central control unit 108. The tracking unit 402 is designed and/or modified to interface with, and receive/transmit data from/to, the meters and/or sensors (not shown) in the slurry storage system. Such a tracking unit 402 may be, for example, a VT3500 cellular/satellite tracking unit commercially available from Peak Wireless, Inc. of Escondido, Calif. Of course, other technologies known to those skilled in the art may certainly be used, including wired transmissions over ordinary landlines.

In operation, the tracking unit 402 communicates slurry data from the meters and/or sensors installed in the slurry storage system to a backend server 404 where the data is stored and processed. Communication from the tracking unit 402 to the backend server 404 may be routed through one or more data cellular towers 406 and/or satellites (not expressly shown) in orbit around the Earth. The communication from the tracking unit 402 provides periodic updates regarding the slurry 200 stored in the slurry storage system to the backend server 404. The frequency of such updates may be defined by the slurry supplier as needed for a particular application. In addition, the tracking unit 402 is also configured to provide an update in real time upon occurrence of a predetermined event (e.g., an alarm being triggered) or upon request by the central control unit 108. Communication may of course also occur from the backend server 404 to the cellular towers 406 and/or satellites and to the tracking unit 402. This is particularly useful for controlling the meters and/or sensors, for example, where the meters and/or sensors include PLCs. Such communication may be in the form of instructions for causing the PLCs to perform one or more operations with respect to the slurry storage system.

From the backend server 404, the slurry data provided by the meters and/or sensors may be accessed by the central control unit 108 and monitored to ensure that the level and condition of the slurry 200 are as specified. Upon occurrence of a predetermined event (e.g., an alarm being triggered), the central control unit 108 sounds and/or display an alarm or otherwise alerts the appropriate personnel (e.g., customer service personnel, sales personnel, a dispatch team, etc.) at the slurry supplier. Corrective actions may then be initiated automatically by the central control unit 108 and/or manually by the personnel at the slurry supplier. The personnel at the slurry supplier may also view historical data and trends based on past reports received from the tracking unit 402, such as the rate of slurry usage, temperature change with respect to time, and other dynamic properties. In some embodiments, the slurry data stored in the backend server 404 may also be accessed by other authorized personnel, for example, personnel 408 at the customer. In such an embodiment, the backend server 404 may be a web server hosting a web site, and the customer personnel 408 may access the backend server using a web browser.

Figure 5:
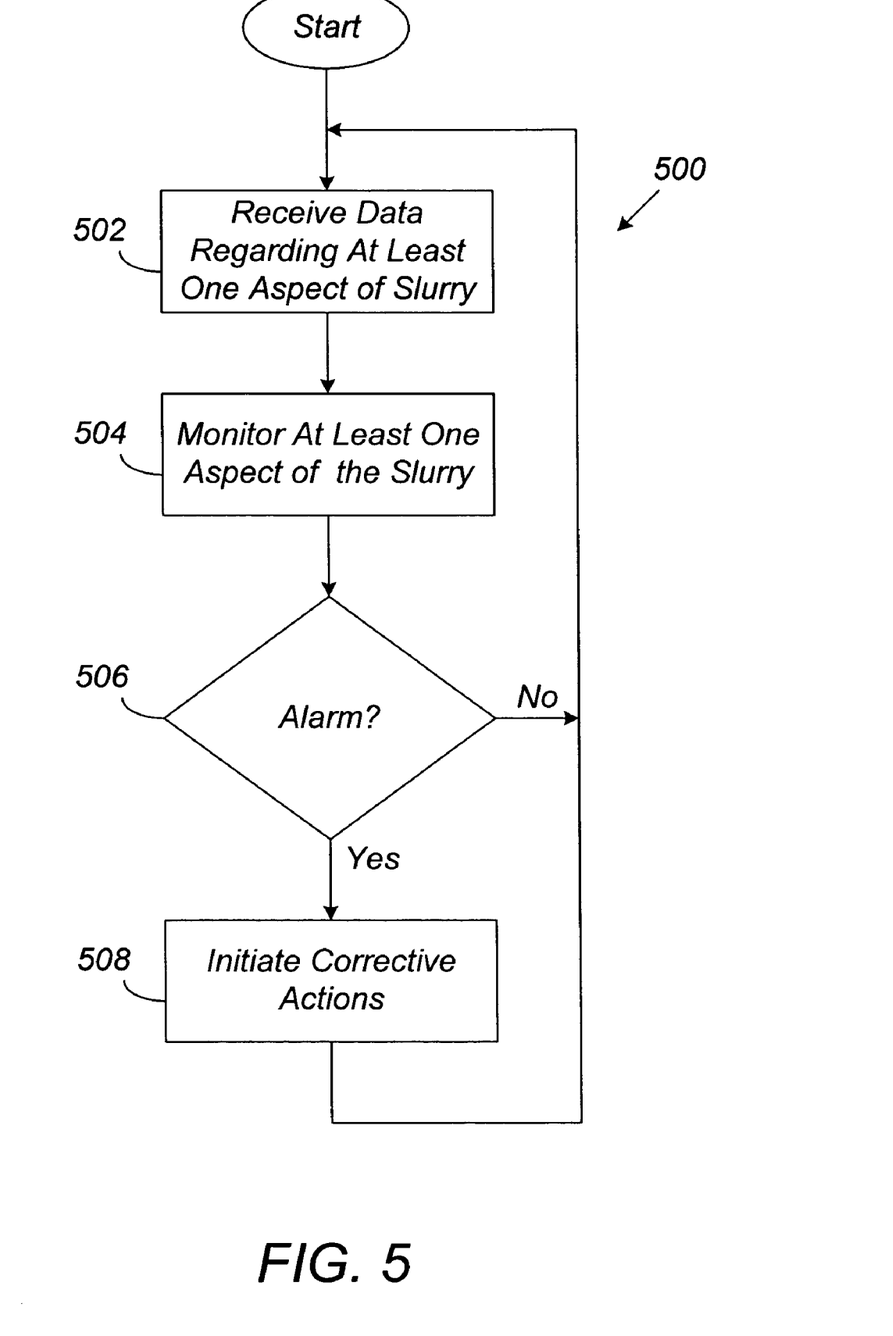
FIG. 5 illustrates a flowchart for an exemplary method and system according to embodiments of the invention.

FIG. 5 illustrates a flowchart 500 that may be used with the slurry monitoring method and system of the invention. It should be noted that, while the flowchart 500 is described in the context of a single slurry storage system, it is fully applicable to multiple slurry storage systems as well. The flowchart 500 begins at step 500, where data is received regarding at least one aspect of the slurry (e.g., level, temperature, viscosity, flow rate, pH, etc.) stored in the slurry storage system. The at least one aspect of the slurry is then monitored at step 504 to ensure that it is in a "field ready" condition and that there is a sufficient supply of slurry. At step 506, a determination is made as to whether any alarms have been triggered, for example, because the level of the slurry at any of the locations is below a predefined threshold level. If the answer is no, then the flowchart 500 returns to step 502 to continue monitoring the slurry. If the answer is yes, then at step 508, an alarm is activated and corrective action is initiated, as needed.

While the present invention has been described with reference to one or more particular embodiments, those skilled in the art will recognize that many changes may be made thereto without departing from the spirit and scope of the present invention. Each of these embodiments and variations thereof is contemplated as falling within the spirit and scope of the claimed invention, which is set forth in the following claims.

What is claimed is:

1. A method of satisfying a customer's slurry needs from a single source, comprising:
   providing a customer with a supply of slurry, the slurry being stored in a remotely located slurry storage system;
   monitoring at least one condition of the slurry stored in the slurry storage system for compliance with one or more predefined criteria;
   mixing the slurry in the slurry storage system based on the at least one condition of the slurry;
   monitoring a level of the slurry stored in the slurry storage system;
   activating an alarm if the level of the slurry stored in the slurry storage system falls below a predefined threshold; and
   delivering new slurry to the customer based upon activation of the alarm.

2. The method according to claim 1, further comprising opening a relief valve if the level of the slurry stored in the slurry storage system rises above a predefined threshold.

3. The method according to claim 1, wherein the condition being monitored includes ambient temperature.

4. The method according to claim 1, wherein the condition being monitored includes slurry temperature.

5. The method according to claim 1, wherein the slurry is delivered to the customer within a predefined amount of time after activation of the alarm.

6. A system for monitoring slurry from a central location, the slurry stored in a slurry storage system, comprising:
   one or more sensors installed in the slurry storage system, the sensors configured to acquire data regarding a level and at least one condition of the slurry;
   a central control unit configured to receive the data regarding the level and the at least one condition of the slurry acquired by the sensors, the central control unit further configured to activate a mixer in the slurry storage system based upon the at least one condition of the slurry, the central control unit still further configured to activate an alarm if the data indicates the level of the slurry falls below a predefined threshold; and
   means for delivering new slurry to the customer based upon activation of the alarm by the central control unit.

7. The system according to claim 6, wherein the central control unit is further configured to open a relief valve if the level of the slurry stored in the slurry storage system rises above a predefined threshold.

8. The system according to claim 6, wherein the condition being monitored includes ambient temperature.

9. The system according to claim 6, wherein the condition being monitored includes slurry temperature.

10. The system according to claim 6, wherein the slurry is delivered to the customer within a predefined amount of time after activation of the alarm.

11. A system for monitoring multiple slurry storage systems from a central location, comprising:
   one or more sensors, at least one sensor installed on each slurry storage system and configured to acquire data regarding a level and at least one other sensor installed in each slurry storage system and configured to acquire data regarding at least one condition of slurry in each slurry storage system;
   one or more tracking units, each tracking unit mounted at one of the slurry storage systems and interfaced with the at least one sensor and the at least one other sensor installed on each slurry storage system, the tracking unit configured to receive the data regarding the level of the slurry storage system from the at least one sensor and the at least one condition of the slurry from the at least one other sensor;
   a backend server in communication with the one or more tracking units, the backend server configured to store and process the data regarding the level and the at least one condition of the slurry from each tracking unit; and
   a central control unit configured to access the data regarding the level and the at least one condition of the slurry from each tracking unit, the central control unit further configured to activate a mixer in any one of the slurry storage systems based upon the at least one condition of the slurry, the central control unit still further configured to activate an alarm if the data indicates the level of the slurry at any one of the slurry storage systems is below a predefined threshold.

12. The system according to claim 11, wherein the tracking units communicate with the backend server using one or more of the following: a cellular network, and a satellite network.

13. The system according to claim 11, wherein the backend server is a web server and the central control unit accesses the data regarding the level and condition of the slurry over the Internet.

14. The system according to claim 11, wherein the backend server is a web server and a third party accesses the data regarding the level and condition of the slurry over the Internet.

15. The system according to claim 11, wherein the central control unit includes a graphical user interface for displaying the data regarding the level and condition of the slurry.

16. The system according to claim 11, wherein at least one of the sensors is a programmable logic controller configured to receive instructions from the central control unit and to perform a predefined operation at one of the slurry storage systems.

17. A method of satisfying a customer's slurry needs from a single source, comprising:
providing a customer with a supply of slurry, the slurry being stored in a remotely located slurry storage system;
monitoring at least one condition of the slurry stored in the slurry storage system for compliance with one or more predefined criteria;
circulating the slurry in the slurry storage system based on the at least one condition of the slurry;
monitoring a level of the slurry stored in the slurry storage system;
activating an alarm if the level of the slurry stored in the slurry storage system falls below a predefined threshold; and
delivering new slurry to the customer based upon activation of the alarm.

18. The method according to claim 17, further comprising opening a relief valve if the level of the slurry stored in the slurry storage system rises above a predefined threshold.

19. The method according to claim 17, wherein the condition being monitored includes ambient temperature.

20. The method according to claim 17, wherein the condition being monitored includes slurry temperature.

21. The method according to claim 17, wherein the slurry is delivered to the customer within a predefined amount of time after activation of the alarm.

22. A system for monitoring slurry from a central location, the slurry stored in a slurry storage system, comprising:
one or more sensors installed in the slurry storage system, the sensors configured to acquire data regarding a level and at least one condition of the slurry;
a central control unit configured to receive the data regarding the level and the at least one condition of the slurry acquired by the sensors, the central control unit further configured to activate a pump in the slurry storage system based upon the at least one condition of the slurry, the central control unit still further configured to activate an alarm if the data indicates the level of the slurry falls below a predefined threshold; and
means for delivering new slurry to the customer based upon activation of the alarm by the central control unit.

23. The system according to claim 22, wherein the central control unit is further configured to open a relief valve if the level of the slurry stored in the slurry storage system rises above a predefined threshold.

24. The system according to claim 22, wherein the condition being monitored includes ambient temperature.

25. The system according to claim 22, wherein the condition being monitored includes slurry temperature.

26. The system according to claim 22, wherein the slurry is delivered to the customer within a predefined amount of time after activation of the alarm.

27. A system for monitoring multiple slurry storage systems from a central location, comprising:
one or more sensors, at least one sensor installed on each slurry storage system and configured to acquire data regarding a level and at least one other sensor installed in each slurry storage system and configured to acquire data regarding at least one condition of slurry in each slurry storage system;
one or more tracking units, each tracking unit mounted at one of the slurry storage systems and interfaced with the at least one sensor and the at least one other sensor installed on each slurry storage system, the tracking unit configured to receive the data regarding the level of the slurry storage system from the at least one sensor and the at least one condition of the slurry from the at least one other sensor;
a backend server in communication with the one or more tracking units, the backend server configured to store and process the data regarding the level and the at least one condition of the slurry from each tracking unit; and
a central control unit configured to access the data regarding the level and the at least one condition of the slurry from each tracking unit, the central control unit further configured to activate a pump in any one of the slurry storage systems based upon the at least one condition of the slurry, the central control unit still further configured to activate an alarm if the data indicates the level of the slurry at any one of the slurry storage systems is below a predefined threshold.

28. The system according to claim 27, wherein the tracking units communicate with the backend server using one or more of the following: a cellular network, and a satellite network.

29. The system according to claim 27, wherein the backend server is a web server and the central control unit accesses the data regarding the level and condition of the slurry over the Internet.

30. The system according to claim 27, wherein the backend server is a web server and a third party accesses the data regarding the level and condition of the slurry over the Internet.

31. The system according to claim 27, wherein the central control unit includes a graphical user interface for displaying the data regarding the level and condition of the slurry.

32. The system according to claim 27, wherein at least one of the sensors is a programmable logic controller configured to receive instructions from the central control unit and to perform a predefined operation at one of the slurry storage systems.

* * * * *